United States Patent
Hanczor et al.

(10) Patent No.: US 12,141,779 B2
(45) Date of Patent: *Nov. 12, 2024

(54) POSITIONAL TICKETING

(71) Applicant: Piper Networks, Inc., San Diego, CA (US)

(72) Inventors: Robert Hanczor, San Diego, CA (US); Duane Maxwell, San Diego, CA (US)

(*) Notice: Subject to any disclaimer, the term of this patent is extended or adjusted under 35 U.S.C. 154(b) by 8 days.

This patent is subject to a terminal disclaimer.

(21) Appl. No.: 18/133,934

(22) Filed: Apr. 12, 2023

(65) Prior Publication Data

US 2023/0245093 A1 Aug. 3, 2023

Related U.S. Application Data

(63) Continuation of application No. 17/401,095, filed on Aug. 12, 2021, now Pat. No. 11,657,381.

(60) Provisional application No. 63/064,853, filed on Aug. 12, 2020.

(51) Int. Cl.
*G06Q 20/32* (2012.01)
*G06Q 20/04* (2012.01)

(52) U.S. Cl.
CPC ..... *G06Q 20/3224* (2013.01); *G06Q 20/0457* (2013.01)

(58) Field of Classification Search
None
See application file for complete search history.

(56) References Cited

U.S. PATENT DOCUMENTS

| | | | |
|---|---|---|---|
| 7,034,683 | B2 | 4/2006 | Ghazarian |
| 7,737,861 | B2 | 6/2010 | Lea et al. |
| 8,255,159 | B1 | 8/2012 | Bierbaum et al. |
| 9,478,071 | B2 | 10/2016 | Hilton |
| 10,332,162 | B1 | 6/2019 | Brock et al. |
| 2007/0050199 | A1 | 3/2007 | Ishibashi et al. |
| 2007/0127422 | A1 | 6/2007 | Belcea |
| 2007/0265891 | A1 | 11/2007 | Guo |
| 2010/0144375 | A1 | 6/2010 | Pfister et al. |
| 2011/0060600 | A1 | 3/2011 | Fox et al. |
| 2011/0313826 | A1 | 12/2011 | Keen et al. |
| 2012/0158443 | A1 | 6/2012 | Kim |
| 2013/0148845 | A1 | 6/2013 | Maeda |

(Continued)

OTHER PUBLICATIONS

International Search Report and Written Opinion in International App. No. PCT/US2021/045782, mailed on Nov. 5, 2021.

(Continued)

*Primary Examiner* — Scott S Trotter
*Assistant Examiner* — Amit Patel
(74) *Attorney, Agent, or Firm* — Gavrilovich, Dodd & Lindsey LLP

(57) ABSTRACT

In general, one aspect disclosed features a system, comprising: a hardware processor; and a non-transitory machine-readable storage medium encoded with instructions executable by the hardware processor to perform operations comprising: identifying a seat in which a passenger is seated in a conveyance having multiple seats based on wireless signals exchanged with a device of a passenger; determining a payment status of the ticket of the passenger using the wireless signals; and generating a map of the conveyance indicating the seat in which the passenger is seated and the payment status of the ticket of the passenger.

20 Claims, 5 Drawing Sheets

(56) References Cited

U.S. PATENT DOCUMENTS

| | | | |
|---|---|---|---|
| 2014/0125355 A1* | 5/2014 | Grant | B61D 33/0057 |
| | | | 324/629 |
| 2014/0207538 A1 | 7/2014 | Jin et al. | |
| 2015/0213660 A1 | 7/2015 | Bergdale et al. | |
| 2015/0239561 A1 | 8/2015 | Hau et al. | |
| 2016/0057574 A1 | 2/2016 | Park | |
| 2016/0182548 A1 | 6/2016 | Ghabra et al. | |
| 2016/0292515 A1 | 10/2016 | Jia et al. | |
| 2017/0286761 A1 | 10/2017 | Zackay et al. | |
| 2017/0301148 A1 | 10/2017 | Vinod | |
| 2018/0211188 A1 | 7/2018 | Bergdale et al. | |
| 2019/0124619 A1 | 4/2019 | Arumugam et al. | |
| 2019/0236322 A1 | 8/2019 | Arquero et al. | |
| 2020/0066060 A1 | 2/2020 | Feuillette et al. | |
| 2022/0024718 A1 | 1/2022 | Ortbauer | |

OTHER PUBLICATIONS

Y. Lu, A. Misra, w. Sun and H. Wu, "Smartphone Sensing Meets Transport Data: A Collaborative Framework for Transportation Service Analytics," in IEEE Transactions on Mobile Computing, vol. 17, No. 4, pp. 945-960, Apr. 1, 2018, doi: 10.1109/TMC .2017.2743176. (Year: 2018).

Bovelli, Sergio, Frank Leipold, and Wolfgang Fischer. "Applications of high and low data rate UWB technology in public transportation." 2009 6th Workshop on Positioning, Navigation and Communication. IEEE, 2009. (Year: 2009).

Ridolfi, Matteo, et al. "Analysis of the scalability of UWB indoor localization solutions for high user densities." Sensors 18.6 (2018): 1875. (Year: 2018).

* cited by examiner

POSITIONAL TICKETING

CROSS REFERENCE TO RELATED APPLICATIONS

The present application is a continuation of U.S. application Ser. No. 17/401,095, filed on Aug. 12, 2021, now allowed, which claims priority to U.S. Provisional Patent Application No. 63/064,853, filed on Aug. 12, 2020, entitled "POSITIONAL TICKETING," the contents of which are incorporated by reference herein in its entirety.

DESCRIPTION OF RELATED ART

The disclosed technology relates generally to ticketing, and more particularly some embodiments relate to ticketing using positioning.

SUMMARY

In general, one aspect disclosed features a system, comprising: a hardware processor; and a non-transitory machine-readable storage medium encoded with instructions executable by the hardware processor to perform operations comprising: identifying a seat in which a passenger is seated in a conveyance having multiple seats based on wireless signals exchanged with a device of a passenger; determining a payment status of the ticket of the passenger using the wireless signals; and generating a map of the conveyance indicating the seat in which the passenger is seated and the payment status of the ticket of the passenger.

Embodiments of the system may include one or more of the following features. In some embodiments, the operations further comprise: displaying the map on a device of a conductor of the conveyance. In some embodiments, the operations further comprise: displaying the payment status of the ticket of the passenger map on a device of a conductor of the conveyance. In some embodiments, the operations further comprise: responsive to determining the payment status of the ticket of the passenger is paid, activating the ticket of the passenger. In some embodiments, identifying the seat in which the passenger is seated using the wireless signals comprises: determining multiple times-of-flight of the wireless signals; determining a location of the device of the passenger relative to the conveyance based on the multiple times-of-flight; and identifying the seat in which the passenger is seated based on the location of the device of the passenger relative to the conveyance and locations of the multiple seats of the conveyance. In some embodiments, the operations further comprise: determining whether the passenger's use of the conveyance has exceeded the value of the ticket; and responsive to determining the passenger's use of the conveyance has exceeded the value of the ticket, sending a message to the device of the passenger, wherein the message prompts the passenger to make an additional payment. In some embodiments, the wireless signals comprise at least one of: ultrawideband (UWB) signals; Bluetooth signals; and WiFi signals.

In general, one aspect disclosed features a non-transitory machine-readable storage medium encoded with instructions executable by a hardware processor of a computing component, the machine-readable storage medium comprising instructions to cause the hardware processor to perform operations comprising: identifying a seat in which a passenger is seated in a conveyance having multiple seats based on wireless signals exchanged with a device of a passenger; determining a payment status of the ticket of the passenger using the wireless signals; and generating a map of the conveyance indicating the seat in which the passenger is seated and the payment status of the ticket of the passenger.

Embodiments of the non-transitory machine-readable storage medium may include one or more of the following features. In some embodiments, the operations further comprise: displaying the map on a device of a conductor of the conveyance. In some embodiments, the operations further comprise: displaying the payment status of the ticket of the passenger map on a device of a conductor of the conveyance. In some embodiments, the operations further comprise: responsive to determining the payment status of the ticket of the passenger is paid, activating the ticket of the passenger. In some embodiments, identifying the seat in which the passenger is seated using the wireless signals comprises: determining multiple times-of-flight of the wireless signals; determining a location of the device of the passenger relative to the conveyance based on the multiple times-of-flight; and identifying the seat in which the passenger is seated based on the location of the device of the passenger relative to the conveyance and locations of the multiple seats of the conveyance. In some embodiments, the operations further comprise: determining whether the passenger's use of the conveyance has exceeded the value of the ticket; and responsive to determining the passenger's use of the conveyance has exceeded the value of the ticket, sending a message to the device of the passenger, wherein the message prompts the passenger to make an additional payment. In some embodiments, the wireless signals comprise at least one of: ultrawideband (UWB) signals; Bluetooth signals; and WiFi signals.

In general, one aspect disclosed features a computer-implemented method comprising: exchanging wireless signals with a device of a passenger seated in a seat of a conveyance having multiple seats; identifying the seat in which the passenger is seated using the wireless signals; determining a payment status of the ticket of the passenger using the wireless signals; and generating a map of the conveyance indicating the seat in which the passenger is seated and the payment status of the ticket of the passenger.

Embodiments of the computer-implemented method may include one or more of the following features. Some embodiments comprise displaying the map on a device of a conductor of the conveyance. Some embodiments comprise displaying the payment status of the ticket of the passenger map on a device of a conductor of the conveyance. Some embodiments comprise responsive to determining the payment status of the ticket of the passenger is paid, activating the ticket of the passenger. In some embodiments, identifying the seat in which the passenger is seated using the wireless signals comprises: determining multiple times-of-flight of the wireless signals; determining a location of the device of the passenger relative to the conveyance based on the multiple times-of-flight; and identifying the seat in which the passenger is seated based on the location of the device of the passenger relative to the conveyance and locations of the multiple seats of the conveyance. Some embodiments comprise determining whether the passenger's use of the conveyance has exceeded the value of the ticket; and responsive to determining the passenger's use of the conveyance has exceeded the value of the ticket, sending a message to the device of the passenger, wherein the message prompts the passenger to make an additional payment. In some embodiments, the wireless signals comprise at least one of: ultrawideband (UWB) signals; Bluetooth signals; and WiFi signals.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the disclosure provide positional ticketing, that is, ticketing using position information. In the described embodiments, the tickets are for passengers seated in a conveyance such as a train car, subway car, bus, airplane, and similar conveyances. However, the disclosed technology is not limited to conveyances, and may be applied to structures that are not conveyances, for example such as stadiums, theaters, and similar structures.

Currently, ticketing passengers on the train car is a manual process performed by a person such as a conductor. That is, the conductor manually observes each passenger, inspects the passenger's ticket, confirms the ticket is activated, confirms the passenger is in the correct seat, and later confirms the passenger has not traveled beyond the ticketed destination. For example, the conductor may manually punch a paper ticket for a passenger. However, these manual processes are time-consuming and subject to human error. For example, the conductor may not notice that a passenger has traveled beyond ticketed destination, or that the passenger is in the wrong seat.

Figure 1:
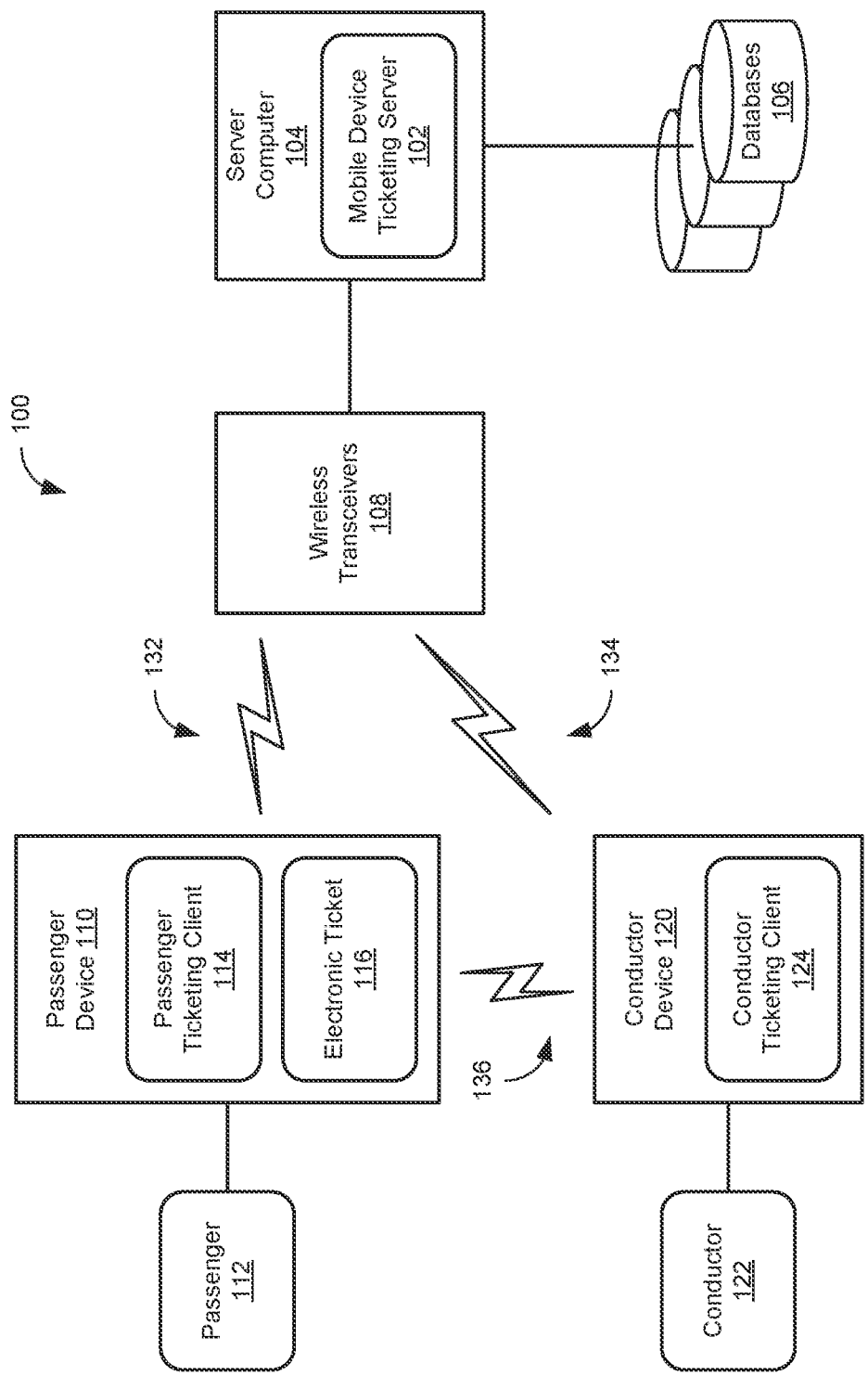
FIG. 1 illustrates a positional ticketing system according to some embodiments of the disclosed technologies.

FIG. 1 illustrates a positional ticketing system 100 according to some embodiments of the disclosed technologies. The positional ticketing system 100 will be described as being disposed within a train. However, as noted above, the positional ticketing system 100 may be disposed within other conveyances and structures. Referring to FIG. 1, the positional ticketing system 100 may include a server computer 104. A mobile device ticketing server 102 may execute on the server computer 104.

The positional ticketing system 100 may include one or more databases 106. The databases 106 may store data for use by the mobile device ticketing server 102. The databases 106 may store data concerning the train. For example, the data may include schedules, stops, identification of train cars, seats or other locations within the train cars, and similar data. The data may include location information for each seat or other location relative to the train car in which the seat is located. For conciseness, in the remainder of this description the term "seat" will be used to represent a seat or other passenger location.

The databases 106 may store data concerning the passengers. The data may include identification information for each passenger. For example, the identification information may include the passengers name, a passenger identification number, ticket numbers associated with the passenger, and similar data.

The databases 106 may store data concerning the tickets. The data may include ticket numbers, identification information of passengers associated with the tickets, identification information of trains associated with the tickets, identification information of train schedules associated with the tickets, identification information of stops associated with the tickets, identification information of trains and cars associated with the tickets, and similar information.

The databases 106 may store processing rules for use by the mobile device ticketing server 102. The rules may govern the operation of the mobile device ticketing server 102. For example, a rule may cause the mobile device ticketing server 102 to alert the conductor when a passenger has traveled beyond the passenger's ticketed destination.

The positional ticketing system 100 may include one or more wireless transceivers 108. The wireless transceivers 108 may be connected to the server computer 104. The wireless transceivers 108 may be controlled by the mobile device ticketing server 102. The wireless transceivers 108 may employ one or more wireless communication protocols. The wireless communication protocols may include one or more of ultrawideband (UWB) signals, Bluetooth signals, WiFi signals, and similar wireless communication protocols.

The positional ticketing system 100 may include a passenger device 110 for use by a passenger 112. The passenger device 110 may be implemented as a smart phone, a tablet, a laptop computer, or a similar computing device. The passenger device 110 may exchange wireless signals 132 with one or more of the wireless transceivers 108.

A passenger ticketing client 114 may execute on the passenger device 110. The passenger device 110 may store one or more electronic tickets 116. Each electronic ticket 116 may be a virtual ticket or a record of a physical ticket. For example, the passenger 112 may purchase a virtual ticket using the passenger ticketing client 114 or another app executing on the passenger device 110, and the virtual ticket may be stored on the passenger device 110. The physical ticket may be a paper ticket, which may be ingested and stored on the passenger device by scanning the paper ticket.

The positional ticketing system 100 may include a conductor device 120 for use by a conductor 122. The conductor device 120 may be implemented as a smart phone, a tablet, a laptop computer, or a similar computing device. A conductor ticketing client 124 may execute on the conductor device 120. The conductor device 120 may exchange wireless signals 134 with one or more of the wireless transceivers 108. The conductor device 120 may exchange wireless signals 136 with the passenger device 110.

Figure 2:
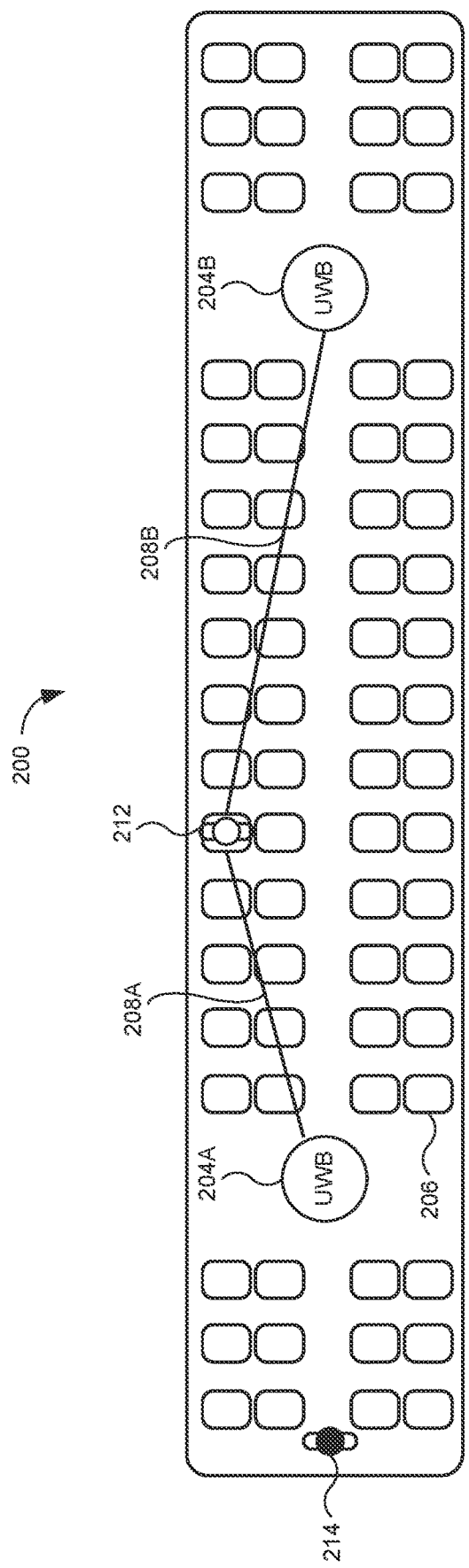
FIG. 2 is a plan view of a train car using a positional ticketing system according to some embodiments of the disclosed technologies.

FIG. 2 is a plan view of a train car 200 using a positional ticketing system according to some embodiments of the disclosed technologies. Referring to FIG. 2, the train car 200 includes multiple seats 206. A passenger 212 is shown seated in one of the seats 206. A conductor 214 is shown at one end of the train car 200.

The train car 200 may include some or all of the elements of the positional ticketing system 100 of FIG. 1. The train car 200 may include multiple wireless transceivers 204A,B. In the example of FIG. 2, the wireless transceivers 204 may employ the UWB protocol. But as noted above, in other examples, the wireless transceivers 204 may employ other wireless protocols instead of, or in addition to, the UWB protocol, or any combination thereof.

In the example of FIG. 2, the UWB signals may be used for communications. For example, the wireless UWB signals may provide a communication link between a passenger device 110 and the server computer 104. The wireless UWB signals may provide a communication link between a conductor device 120 and the server computer 104. The wireless UWB signals may provide a communication link directly between a passenger device 110 and a conductor device 120. The mobile device ticketing server 102, the passenger ticketing client 114, and the conductor ticketing client 124 may exchange data over these communication links to perform various ticketing functions, for example as described elsewhere in this description.

The UWB signals may be used for ranging. For example, the UWB signals may be used to determine times-of-flight of the UWB signals between the UWB transceivers 204A,B and the passenger device 110, as illustrated at 208A,B in FIG. 2. The times-of-flight may be used together with conventional positioning techniques to determine a position of the passenger device 110 relative to the train car 200. Similar techniques may be employed to determine a position of the conductor device 120 relative to the train car 200. With the position of the passenger device 110 relative the train car 200, and knowledge of the location of each seat relative to the train car 200, it may be determined in which seat 206 the passenger 212 is seated.

Figure 3:
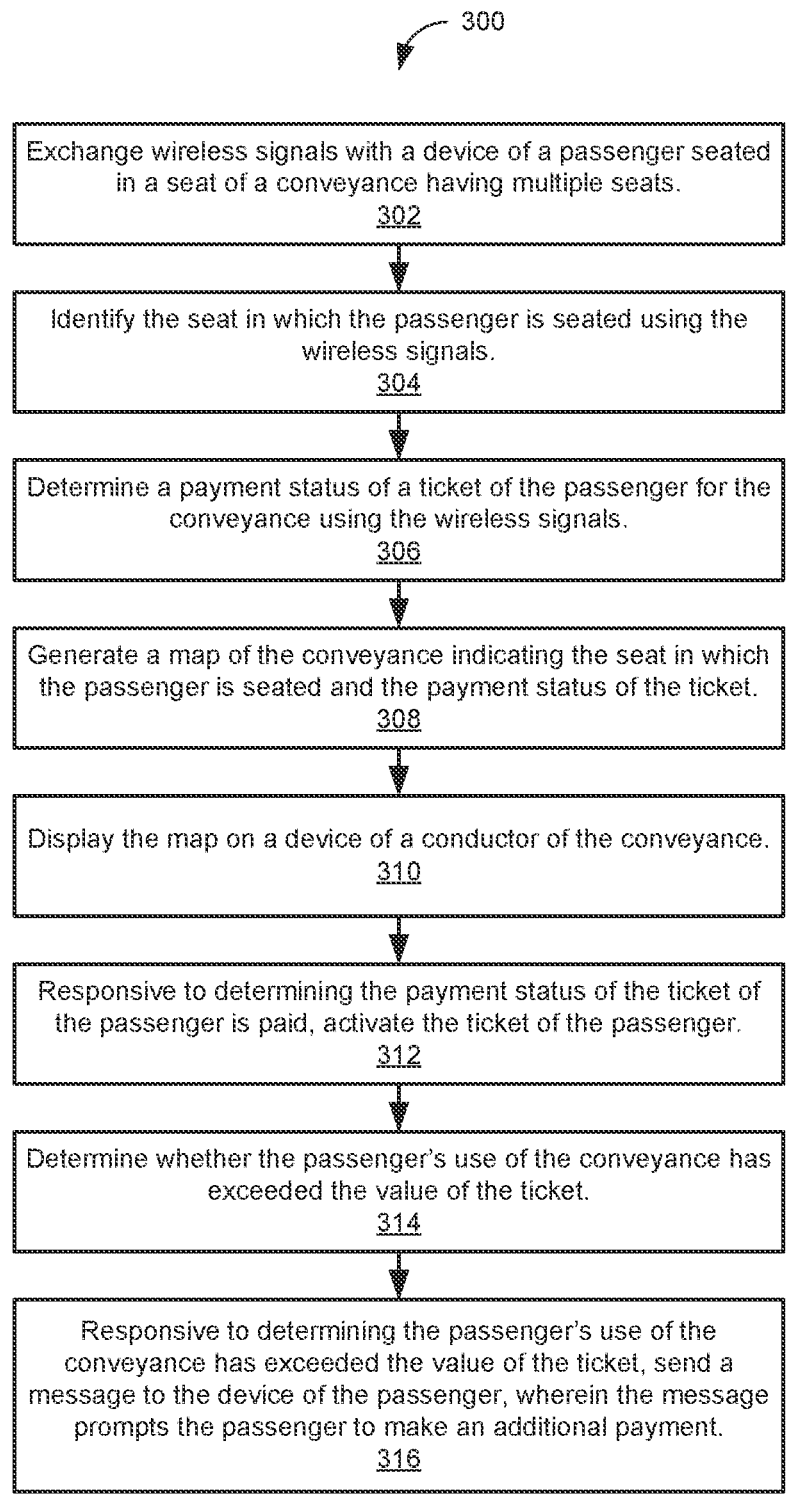
FIG. 3 is a flowchart illustrating a process for positional ticketing according to some embodiments of the disclosed technologies.

FIG. 3 is a flowchart illustrating a process 300 for positional ticketing according to some embodiments of the disclosed technologies. The process 300 may be implemented in any conveyance or other structure having multiple seats. For example, the process 300 may be implemented in the positional ticketing system 100 of FIG. 1, in the train car 200 of FIG. 2, or both.

The elements of the process 300 are presented in one arrangement. However, it should be understood that one or more elements of the process may be performed in a different order, in parallel, omitted entirely, and the like. Furthermore, the process 300 may include other elements in addition to those presented. For example, the process 300 may include error-handling functions if exceptions occur, and the like.

Referring to FIG. 3, the process 300 may include exchanging wireless signals with a device of a passenger seated in a seat of a conveyance having multiple seats, at 302. In the example of FIG. 1, wireless transceivers 108 and/or the conductor device 120 may exchange wireless signals with the passenger device 110. As noted above, any wireless signals or combination of wireless signals may be used. Each wireless signal may be used for communications, ranging, or both.

Referring again to FIG. 3, the process 300 may include identifying the seat in which the passenger is seated using the wireless signals, at 304. For example, as described elsewhere in this disclosure, the process 300 may include determining a time-of-flight of each wireless signal between the passenger device 110 and the wireless transceiver 108, the conductor device 120, or both. The process 300 may include determining a location of the device of the passenger 112 relative to the conveyance based on the multiple times-of-flight, and identifying the seat in which the passenger 112 is seated based on the location of the passenger device 110 relative to the conveyance and locations of the multiple seats in the conveyance.

It is not uncommon for one passenger to hold the tickets for a group of passengers. For example, one family member may hold all of the tickets for the family. In these cases, the process 300 may include identifying the seats in which all of passengers in the group are seated. Other steps of process 300 may apply to this example as well.

In some embodiments, the process of identifying the seat in which the passenger 112 is seated may be initiated automatically. For example, the process may be initiated automatically by the mobile device ticketing server 102 on detecting the presence of the passenger device 110. As another example, the process may be initiated by the passenger ticketing client 114 on detecting wireless signals transmitted by the wireless transceivers 108 or the conductor device 120.

In some embodiments, the process of identifying the seat in which the passenger 112 is seated may be initiated manually by the passenger 112. For example, the passenger ticketing client 114 may display a graphical user interface containing a "locate me" display element on a touchscreen of the passenger device 110. The process of identifying the seat in which the passenger 112 is seated may be initiated responsive to the passenger 112 operating the display element.

In some embodiments, the passenger 112 may launch the passenger ticketing client 114 manually, for example by operating a user interface of the passenger device 110. In some embodiments, the passenger 112 may launch the passenger ticketing client 114 by scanning a barcode, QR code, NFC tag, or similar device located on or in the train car 200, for example on one of the seats.

In some embodiments, the passenger ticketing client 114 may launch automatically. For example, the passenger ticketing client 114 may launch automatically responsive to detecting the wireless signals transmitted by the wireless transceivers 108 or the conductor device 120. The passenger ticketing client 114 may launch automatically when the conductor device 120 is within a predetermined range of the passenger device 110.

In some embodiments, the process of identifying the seat in which the passenger 112 is seated may be initiated manually by the conductor 122. In some embodiments, the conductor 122 may launch the conductor ticketing client 124 by scanning a barcode, QR code, NFC tag, or similar code or device located on or in the train car 200, for example on one of the seats. In some embodiments, the conductor ticketing client 124 may display a graphical user interface containing a "locate passengers" display element on a touchscreen of the passenger device 110. The process of identifying the seat in which the passenger 112 is seated may be initiated responsive to the conductor 122 operating the display element. In some embodiments, the conductor 122 may launch the conductor ticketing client 124 manually, for example by operating a user interface of the conductor device 120.

In some embodiments, the conductor ticketing client 124 may launch automatically responsive to detecting the wireless signals transmitted by the wireless transceivers 108 or the passenger device 110. For example, the conductor ticketing client 124 may launch automatically when the conductor device 120 is within a predetermined range of the passenger device 110.

Referring again to FIG. 3, the process 300 may include determining a payment status of a ticket of the passenger for the conveyance using the wireless signals, at 306. In some cases, the ticket may be a physical ticket. In such cases, the passenger ticketing client 114 may ingest the ticket information by scanning the ticket, by scanning a barcode, QR code, NFC tag, or similar code or device located on or in the ticket. In other cases, the ticket may be a virtual ticket that exists as a record stored on the passenger device 110, for example such as the electronic ticket 116 of FIG. 1. The ticket information may indicate the payment status of the ticket, which may indicate the ticket is paid or not paid. In some examples, the passenger ticketing client 114 may transmit the ticket payment status as an electronic message over the wireless signals. In other examples, the passenger ticketing client 114 may transmit the ticket information over the wireless signals, and the mobile device ticketing server 102 or the conductor ticketing client 124 may determine the ticket status based on the ticket information.

Referring again to FIG. 3, the process 300 may include generating a map of the conveyance indicating the seat in which the passenger is seated and the payment status of the ticket of the passenger, at 308. The map may take any form. For example, the map may take the form of a table or spreadsheet. In other examples, the map may take a graphical form.

Referring to FIG. 3, the process 300 may include displaying the map on a device of a conductor of the conveyance, at 310. For example, the conductor ticketing client 124 may display the map on a display of the conductor device 120 of FIG. 1.

Figure 4:
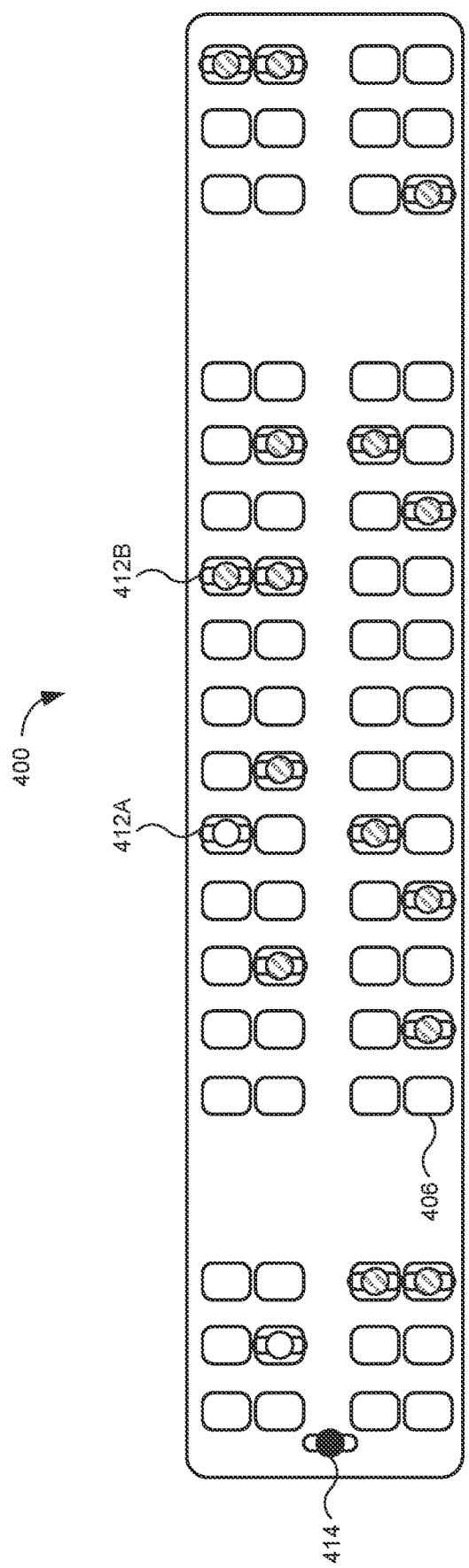
FIG. 4 illustrates a graphical interface representing an example map of the train car of FIG. 2 according to some embodiments of the disclosed technologies.

FIG. 4 illustrates a graphical interface 400 representing an example map of the train car 200 of FIG. 2 according to some embodiments of the disclosed technologies. Referring to FIG. 4, the map may include display elements 406 representing the seats of the train car 200. The map may also include display elements 412 representing the passengers in their seats. The display elements 412 representing the passengers may differ based on the payment status of their tickets. In the example of FIG. 4, passengers having tickets with a paid status may be represented by unmarked display elements 412A, while passengers having tickets with an unpaid status may be represented by marked display elements such as the cross-hatched display elements 412B. The map may also include a display element 414 having a different marking that represents the location of the conductor 122. The map may be updated frequently to show changes in the payment status of the passenger's tickets, as well as movements of the conductor 122.

Referring again to FIG. 3, the process 300 may include, responsive to determining the payment status of the ticket of the passenger is paid, activating the ticket of the passenger, at 312. Activating the ticket may be the virtual equivalent of a conductor 122 punching a hole in the paper ticket. Activating the ticket may include flagging a record of the ticket in the databases 106 of FIG. 1. Activating the ticket may also include flagging a record of the ticket on the passenger device 110 and/or the conductor device 120. Activation status of passengers' tickets may be indicated on the map of the train car.

Referring again to FIG. 3, the process 300 may include determining whether the passenger's use of the conveyance has exceeded the value of the ticket, at 314. For example, the mobile device ticketing server 102 may determine the passenger's destination according to information stored in the databases 106, such as the passenger information and ticket information. The mobile device ticketing server 102 may also track the location of the train car 200 along its route. In some embodiments, the mobile device ticketing server 102 may cause the passenger ticketing client 114 to alert the passenger 112 when the train car 200 is approaching the passenger's destination.

Referring again to FIG. 3, the process 300 may include, responsive to determining the passenger's use of the conveyance has exceeded the value of the ticket, sending a message to the device of the passenger, wherein the message prompts the passenger to make an additional payment, at 316. For example, the mobile device ticketing server 102 may cause the passenger ticketing client 114 to alert the passenger 112 when the passenger 112 has remained on the train car 200 past the passenger's destination. The mobile device ticketing server 102 may cause the passenger ticketing client 114 to display a user interface to allow the passenger 112 to add funds to the ticket. In some embodiments, responsive to determining the passenger 112 has remained on the train car 200 past the passenger's destination, the mobile device ticketing server 102 may cause the conductor ticketing client 124 to alert the conductor 122 so the conductor 122 may assist the passenger 112 to add funds to the ticket.

Embodiments of the disclosed technologies provide several significant advantages over current solutions. For example, by automating much of the ticketing process, the disclosed technologies reduce the human labor required by, and the human error incurred in, current processes. As another example, the disclosed technologies reduce the time required by current processes. Passengers often are not prepared to show the conductor the virtual ticket on their devices. This results in wasted time while the conductor waits for the passenger to wake their device, and find the application and the ticket to show to the conductor. As noted above, the device carried by the conductor is capable of activating the tickets on the passenger device using a background waking function. Thus, in situations where rail cars are crowded and/or passengers are standing and cannot be definitively distinguished as being assigned to a particular seat, the communication between the conductor device and the passenger device can dynamically wake the device and activate the virtual ticket for visual or automatic inspection.

Figure 5:
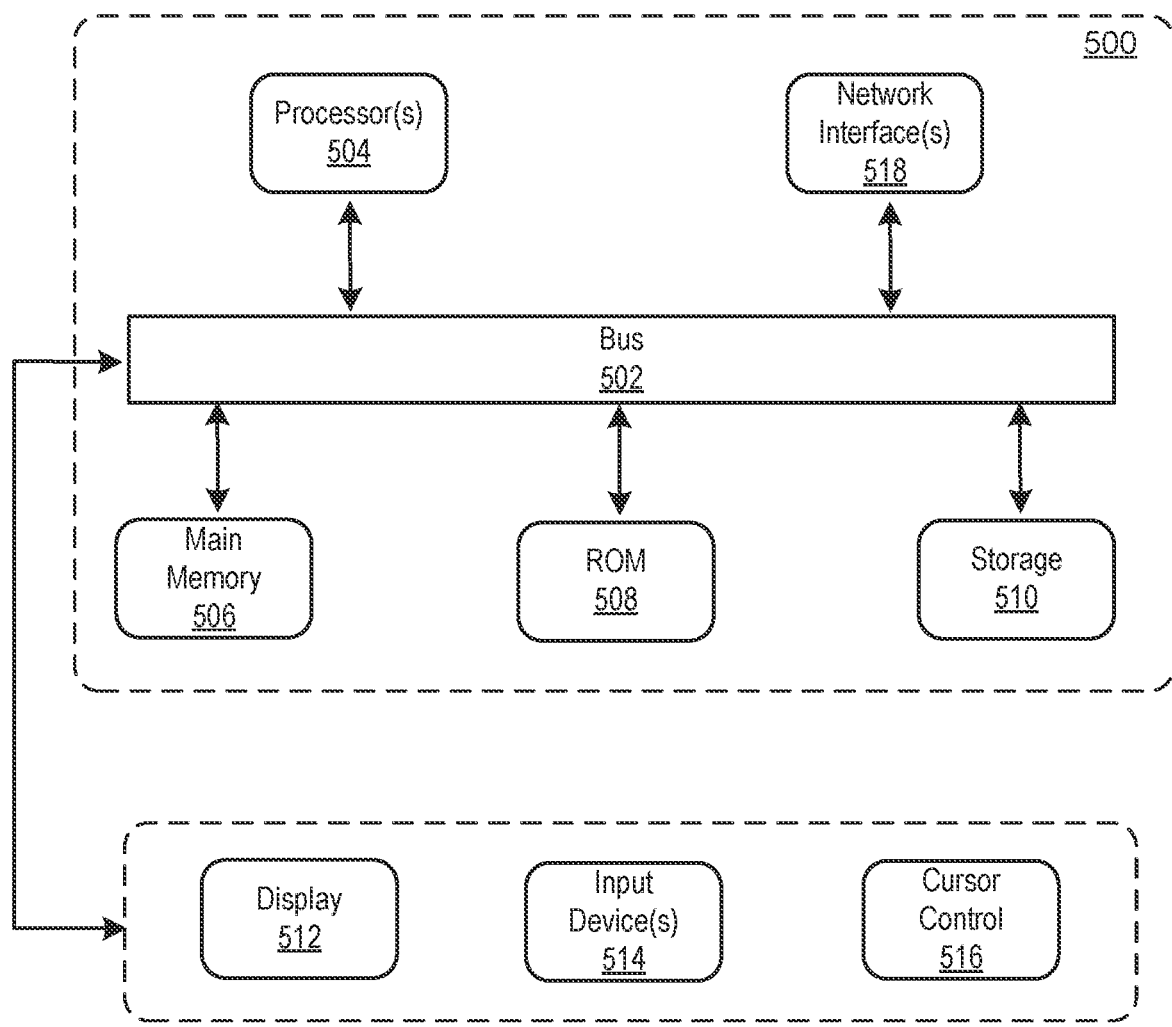
FIG. 5 is an example computing component that may be used to implement various features of embodiments described in the present disclosure.

FIG. 5 depicts a block diagram of an example computer system 500 in which embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or a WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A conductor device, comprising:
   one or more hardware processors;
   one or more non-transitory machine-readable storage media encoded with instructions executable by the one or more hardware processors to cause the conductor device to perform operations comprising:
   detecting wireless signals transmitted by a passenger device of a passenger on a conveyance;
   identifying an electronic ticket stored on the passenger device based on the wireless signals transmitted by the passenger device;
   determining a payment status of the ticket;
   determining whether the passenger's use of the conveyance has exceeded a value of the ticket; and
   responsive to determining the passenger's use of the conveyance has exceeded the value of the ticket, sending a communication to the passenger device, wherein the communication causes the passenger device to wake and activate the ticket for inspection.

2. The conductor device of claim 1, the operations further comprising:
   displaying the payment status of the ticket on a display of the conductor device.

3. The conductor device of claim 1, the operations further comprising:
   determining when the conductor device is within a predetermined range of the passenger device based on the first wireless signals transmitted by the passenger device; and
   launching a conductor client on the conductor device responsive to determining the conductor device is within the predetermined range of the passenger device.

4. The conductor device of claim 1, the operations further comprising:
   identifying a seat in which the passenger is seated in the conveyance based on second wireless signals transmitted by a wireless transceiver of the conveyance.

5. The conductor device of claim 4, the operations further comprising:
   generating a map of the conveyance indicating the seat in which the passenger is seated and the payment status of the ticket; and
   displaying the map on a display of the conductor device.

6. The conductor device of claim 4, wherein identifying the seat in which the passenger is seated based on the second wireless signals comprises:
   determining multiple times-of-flight of the second wireless signals;
   determining a location of the passenger device relative to the conveyance based on the multiple times-of-flight; and
   identifying the seat in which the passenger is seated based on the location of the passenger device relative to the conveyance and locations of seats of the conveyance.

7. The conductor device of claim 1, wherein the first wireless signal comprises at least one of:
   ultrawideband (UWB) signals;
   Bluetooth signals;
   WiFi signals.

8. One or more non-transitory machine-readable storage media encoded with instructions executable by one or more hardware processors of a conductor device, the machine-readable storage comprising instructions to cause the one or more hardware processors to cause the conductor device to perform operations comprising:
   detecting wireless signals transmitted by a passenger device of a passenger on a conveyance;
   identifying an electronic ticket stored on the passenger device based on the wireless signals transmitted by the passenger device;
   determining a payment status of the ticket;
   determining whether the passenger's use of the conveyance has exceeded the value of the ticket; and responsive to determining the passenger's use of the conveyance has exceeded the value of the ticket, sending a communication to the passenger device, wherein the communication causes the passenger device to wake and activate the ticket for inspection.

9. The non-transitory machine-readable storage media of claim 8, the operations further comprising:
displaying the payment status of the ticket on a display of the conductor device.

10. The non-transitory machine-readable storage media of claim 8, the operations further comprising:
determining when the conductor device is within a predetermined range of the passenger device based on the first wireless signals transmitted by the passenger device; and
launching a conductor client on the conductor device responsive to determining the conductor device is within the predetermined range of the passenger device.

11. The non-transitory machine-readable storage media of claim 8, the operations further comprising:
identifying a seat in which the passenger is seated in the conveyance based on second wireless signals transmitted by a wireless transceiver of the conveyance.

12. The non-transitory machine-readable storage media of claim 11, the operations further comprising:
generating a map of the conveyance indicating the seat in which the passenger is seated and the payment status of the ticket; and
displaying the map on a display of the conductor device.

13. The non-transitory machine-readable storage media of claim 11, wherein identifying the seat in which the passenger is seated based on the second wireless signals comprises:
determining multiple times-of-flight of the second wireless signals;
determining a location of the passenger device relative to the conveyance based on the multiple times-of-flight; and
identifying the seat in which the passenger is seated based on the location of the passenger device relative to the conveyance and locations of seats of the conveyance.

14. The non-transitory machine-readable storage media of claim 8, wherein the first wireless signal comprises at least one of:
ultrawideband (UWB) signals;
Bluetooth signals;
WiFi signals.

15. A computer-implemented method for a conductor device, the method comprising:
detecting wireless signals transmitted by a passenger device of a passenger on a conveyance;
identifying an electronic ticket stored on the passenger device based on the wireless signals transmitted by the passenger device;
determining a payment status of the ticket;
determining whether the passenger's use of the conveyance has exceeded the value of the ticket; and
responsive to determining the passenger's use of the conveyance has exceeded the value of the ticket, sending a communication to the passenger device, wherein the communication causes the passenger device to wake and activate the ticket for inspection.

16. The computer-implemented method of claim 15, further comprising:
displaying the payment status of the ticket on a display of the conductor device.

17. The computer-implemented method of claim 15, further comprising:
determining when the conductor device is within a predetermined range of the passenger device based on the first wireless signals transmitted by the passenger device; and
launching a conductor client on the conductor device responsive to determining the conductor device is within the predetermined range of the passenger device.

18. The computer-implemented method of claim 15, further comprising:
identifying a seat in which the passenger is seated in the conveyance based on second wireless signals transmitted by a wireless transceiver of the conveyance.

19. The computer-implemented method of claim 18, further comprising:
generating a map of the conveyance indicating the seat in which the passenger is seated and the payment status of the ticket; and
displaying the map on a display of the conductor device.

20. The computer-implemented method of claim 15, wherein the first wireless signal comprises at least one of:
ultrawideband (UWB) signals;
Bluetooth signals;
WiFi signals.

* * * * *